(12) United States Patent
Baltes et al.

(10) Patent No.: US 11,781,569 B2
(45) Date of Patent: Oct. 10, 2023

(54) BELLOWS ACCUMULATOR

(71) Applicant: HYDAC TECHNOLOGY GMBH, Sulzbach/Saar (DE)

(72) Inventors: Herbert Baltes, Losheim (DE); Peter Kloft, Ransbach-Baumbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 449 days.

(21) Appl. No.: 17/275,756

(22) PCT Filed: Sep. 9, 2019

(86) PCT No.: PCT/EP2019/073942
§ 371 (c)(1),
(2) Date: Mar. 12, 2021

(87) PCT Pub. No.: WO2020/053123
PCT Pub. Date: Mar. 19, 2020

(65) Prior Publication Data
US 2022/0042524 A1 Feb. 10, 2022

(30) Foreign Application Priority Data

Sep. 14, 2018 (DE) ...................... 10 2018 007 280.1

(51) Int. Cl.
*F15B 1/10* (2006.01)
*F15B 1/14* (2006.01)

(52) U.S. Cl.
CPC ................ *F15B 1/103* (2013.01); *F15B 1/14* (2013.01); *F15B 2201/205* (2013.01);
(Continued)

(58) Field of Classification Search
CPC .............. F15B 1/103; F15B 2201/3153; F15B 2201/4056
See application file for complete search history.

(56) References Cited

U.S. PATENT DOCUMENTS 6,286,552 B1 * 9/2001 Shimbori ............. B23K 11/002
220/721
2012/0211111 A1 * 8/2012 Baltes ..................... F15B 1/103
138/30
(Continued)

FOREIGN PATENT DOCUMENTS

DE 33 27 738 5/1994
DE 19852628 A1 * 5/2000 ............ B60T 13/148
(Continued)

OTHER PUBLICATIONS

International Search Report (ISR) dated Nov. 13, 2019 in International (PCT) Application No. PCT/EP2019/073942.

*Primary Examiner* — Thomas E Lazo
(74) *Attorney, Agent, or Firm* — WENDEROTH, LIND & PONACK, L.L.P.

(57) ABSTRACT

A bellows accumulator, consisting of at least two housing parts (4, 6) which form an accumulator housing (2), and having a separating bellows (20), which is movably arranged in the accumulator housing (2) and separates two media spaces (8, 22) from each other and is at least on its one free end fixed to a securing device (24) in the accumulator housing (2), wherein said securing device (24) is welded to the adjacently arranged housing parts (4, 6), is characterized in that the adjacently arranged housing parts (4, 6) comprise at least in part titanium materials, in that the securing device (24) consists of at least two interconnected components (26, 30), at least one (26) of which comprises at least in part titanium materials and is welded to the adjacently arranged housing parts (4, 6), and in that the respective other component (30), consisting of a different metal material, is used for securing the separating bellows (20) to the securing device (24).

11 Claims, 3 Drawing Sheets

(52) U.S. Cl.
CPC ........... *F15B 2201/3153* (2013.01); *F15B 2201/3156* (2013.01); *F15B 2201/3157* (2013.01); *F15B 2201/3158* (2013.01); *F15B 2201/4053* (2013.01); *F15B 2201/4056* (2013.01); *F15B 2201/605* (2013.01); *F15B 2201/61* (2013.01)

(56) References Cited

U.S. PATENT DOCUMENTS

2016/0061224 A1    3/2016    Hellwege et al.
2018/0245656 A1*    8/2018    Baltes ................ F16F 9/006

FOREIGN PATENT DOCUMENTS

| | | | |
|---|---|---|---|
| DE | 10 2006 014 456 | 10/2007 | |
| DE | 10 2015 012 253 | 3/2017 | |
| EP | 2 519 748 | 10/2016 | |
| FR | 2 563 584 | 10/1985 | |
| WO | WO-0212731 A1 * | 2/2002 | ............ F15B 1/103 |
| WO | WO-2011079852 A1 * | 7/2011 | ............ F15B 1/103 |

* cited by examiner

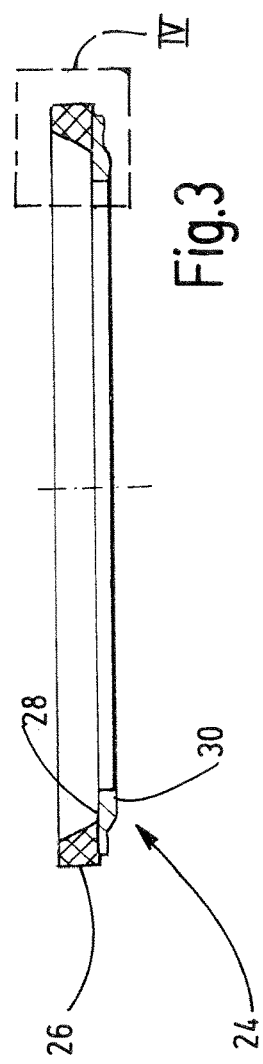
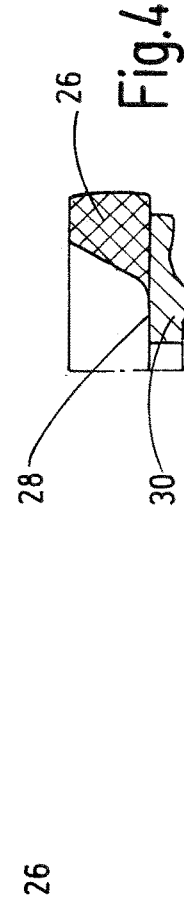
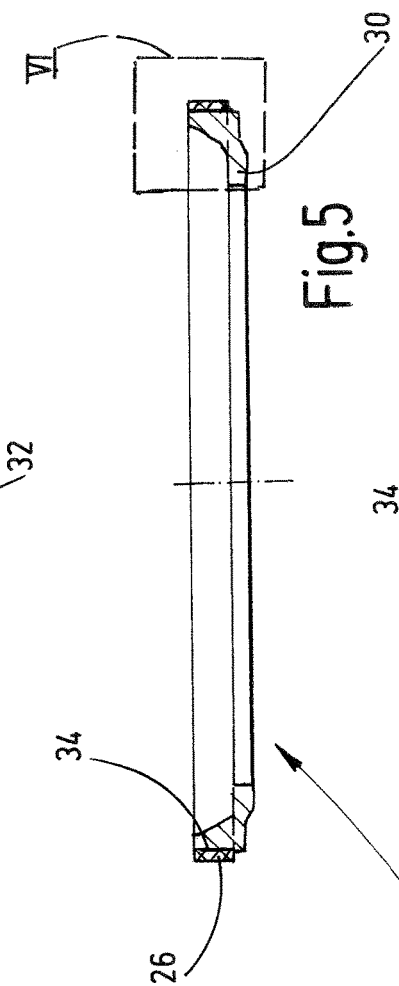
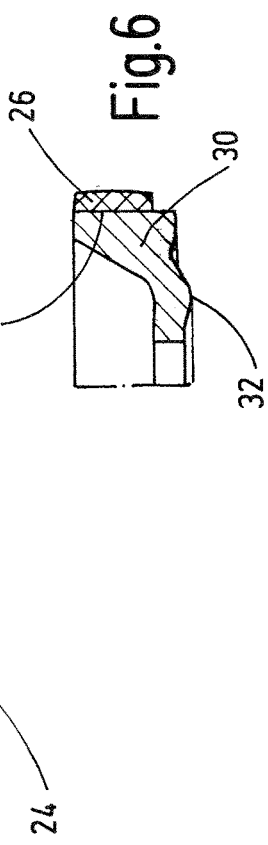
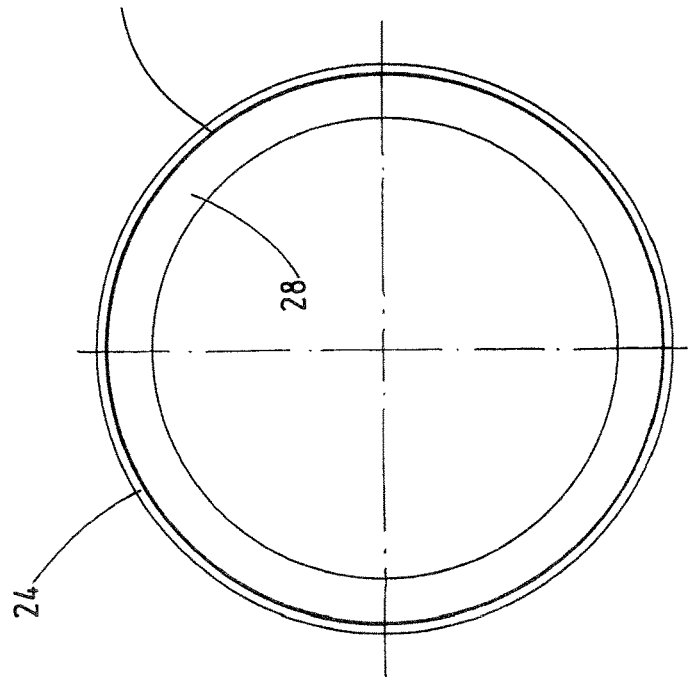

BELLOWS ACCUMULATOR

The invention relates to a bellows accumulator, consisting of at least two housing parts, which form an accumulator housing, and having a separating bellows, which is movably arranged in the accumulator housing and separates two media spaces from each other and is at least on its one free end fixed to a securing device in the accumulator housing, wherein said securing device is welded to the housing parts arranged adjacently.

Bellows accumulators of this type are state of the art, cf. for instance DE 10 2015 012 253 A1. Bellows accumulators are advantageously used in hydraulic systems, preferably to reduce or smooth pressure peaks occurring in pressure fluids. In some application areas, such as aerospace applications, bellows accumulators used should have the lowest possible structural weight while maintaining a high resistance to pressure. The known bellows accumulators do not sufficiently come up to the demands.

Based on the state of the art, the invention addresses the problem of providing a bellows accumulator of the type mentioned above, which is characterized by a particularly favorable ratio between its structural weight and its structural strength ensuring the safe operating behavior.

According to the invention, this problem is solved by a bellows accumulator having the features of claim 1 in its entirety.

According to the characterizing part of claim 1, an essential feature of the invention is that the adjacently arranged housing parts comprise at least in part titanium materials, that the securing device consists of at least two interconnected components, at least one of which comprises at least in part titanium materials and is welded to the housing parts arranged adjacently, and that the respective other component, consisting of a different metal material, is used to secure the separating bellows to the securing device.

When it comes to creating technical products that provide high strength at low weight, the general trend among experts is to use titanium materials instead of other metal materials such as steel. This procedure is advantageous and practicable for many applications, but is not feasible in cases where titanium materials and other metallic materials have to be welded to each other, because welded joints between such material pairings cannot be executed securely. This problem also arises when forming a bellows accumulator having housing parts consisting of titanium, because the use of titanium as a material for the assigned metal bellows would result in very limited dynamic strength of the bellows. Because the bellows has to be made from materials more suitable to this purpose, such as chromium-nickel-molybdenum stainless steel (AM350), and the securing device also has to be made from a steel material, the production of the entire bellows accumulator from titanium has not been possible up to now because of the material pairing of titanium/steel, which is not suitable for a welded joint.

The solution to this problem indicated in patent claim 1 provides for the formation of the securing device from interconnected components, one of which made of titanium material is welded to the housing parts made of titanium, whereas the other component, in the form of a different metal material, forms a trouble-free welding joint with the bellows. With the accumulator housing consisting of titanium and forming the major part, the bellows accumulator according to the invention is lightweight at a high strength and is characterized by favorable operating behavior with a metal bellows formed from a stainless steel suitable for the intended application.

Advantageously, both the separating bellows and the respective other component of the securing device are made of stainless steel. A chrome-nickel-molybdenum stainless steel is particularly suitable as a bellows material, as available under the name AM350. The material used for the securing device can advantageously be 1.4435, an austenitic steel providing excellent weldability.

In this case, the two adjacent housing parts and the one component of the securing device can consist of titanium. Based on these material pairings, the welded joints at the junction of the housing parts and the one component of the securing device, as well as the joint between the metal bellows and the other component of the securing device, can each be made without issues.

With particular advantage, the arrangement may be such that the one component consisting of titanium and the other component made of stainless steel are firmly connected with each other by cladding, preferably explosive cladding. This well-known process (http://smt-holland.com/), technically also known as explosive welding, is a cold pressure welding process, which can be used to weld materials together in a vacuum-sealed manner that cannot be welded together using conventional welding processes, such as titanium/steel. Other suitable cladding processes can be used instead of explosive cladding.

Advantageously, the securing device is formed as a closed ring, wherein the one component encompasses the other component annular or, is fixed, annular and having a projecting protrusion, to the one end face, facing away from the end face having the welded-on separating bellows, of the other component.

The welded joint between the two adjacent housing parts forming a lower and an upper shell of the accumulator housing may advantageously be obtained in conjunction with the titanium component of the securing device using an electron beam welding process.

In preferred exemplary embodiments, the other free end face of the separating bellows is closed by a guide part, which is firmly welded to the separating bellows.

Advantageously, the arrangement can be made such that the guide part has a guide device and a sealing device, wherein the sealing device is effective at least in the end position of the separating bellows when the media connection in the accumulator housing is closed and is ineffective in other working positions of the separating bellows that deviate therefrom. For this purpose, on the inside of the housing part a ramp can be formed, which leads to a sealing surface of reduced inner diameter and via which the sealing device runs onto the sealing surface when the end position is reached.

Advantageously, the guide part, at its end facing the media port, can comprise a dome, the outer contour of which follows the inner contour of the lower shell in the area of the media port and is brought at least partially into contact with the latter in one end position. Thus in the end position, virtually no free residual volume remains in the lower shell.

In this case, the sealing device can be arranged between the dome and the guide device of the guide part and can be set back in diameter relative to the guide device, such that the outer diameter of the sealing device is adapted to the reduced inner diameter sealing surface of the lower housing part.

In particularly advantageous exemplary embodiments, the guide part is also formed from titanium and has, on its end face facing the separating bellows, an annular component made of stainless steel and firmly attached by cladding, on which the welded connection to the separating bellows is formed. As a result, the guide part, which together with its dome is a large-area individual part, is also made of a lightweight material.

Below the invention is explained in detail with reference to exemplary embodiments shown in the drawing. In the Figures:

FIG. 2 shows a top view of a retaining ring of the securing device of the exemplary embodiment;

FIG. 3 shows a longitudinal section of the retaining ring of the exemplary embodiment;

FIG. 4 shows an enlarged partial section of the area designated IV in FIG. 3;

FIG. 5 shows a longitudinal section of the retaining ring of a modified exemplary embodiment of the bellows accumulator;

FIG. 6 shows a partial section of the area designated VI in FIG. 5.

Figure 1:
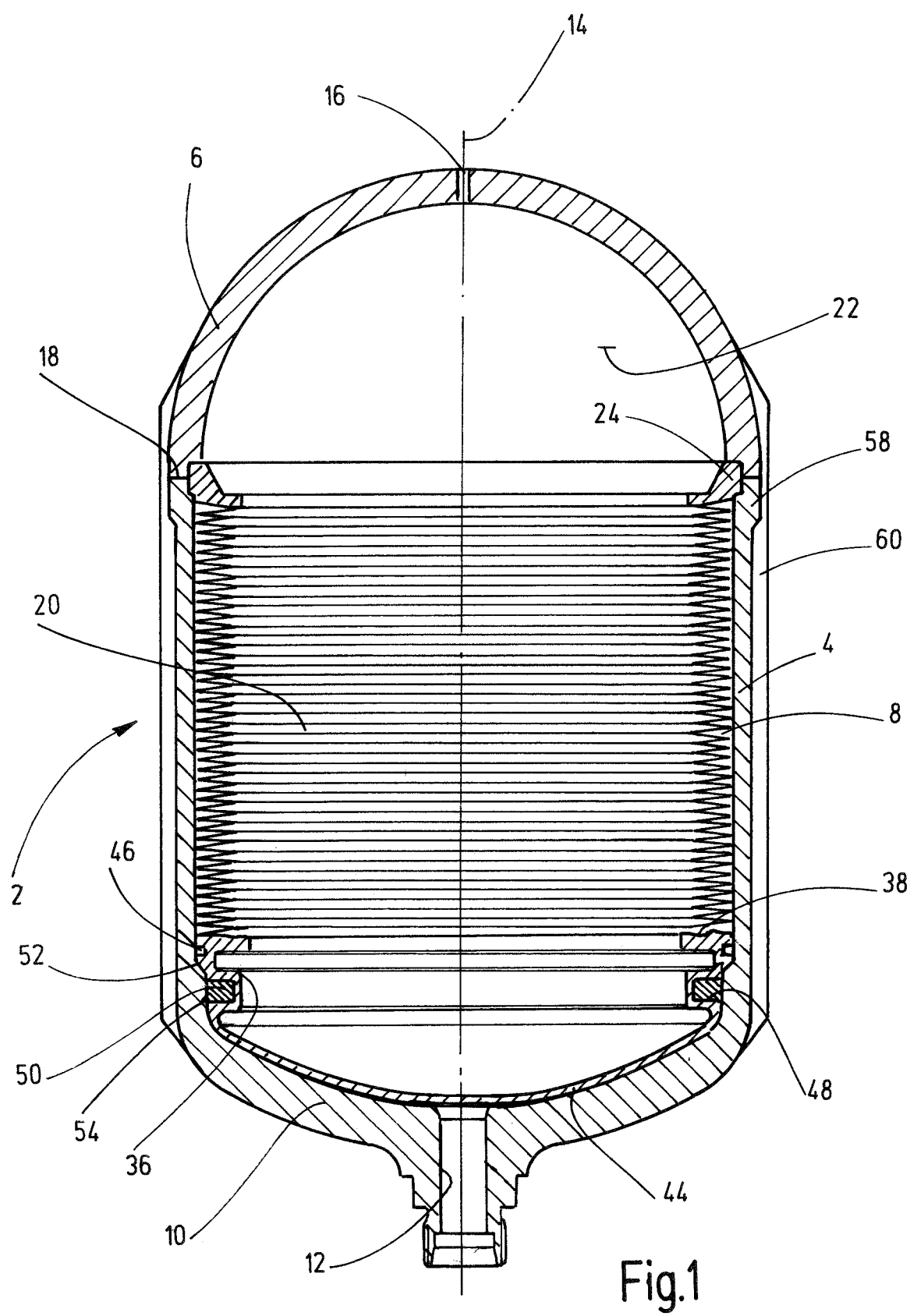
FIG. 1 shows a longitudinal section of an exemplary embodiment of the bellows accumulator according to the invention.
Figure 7:
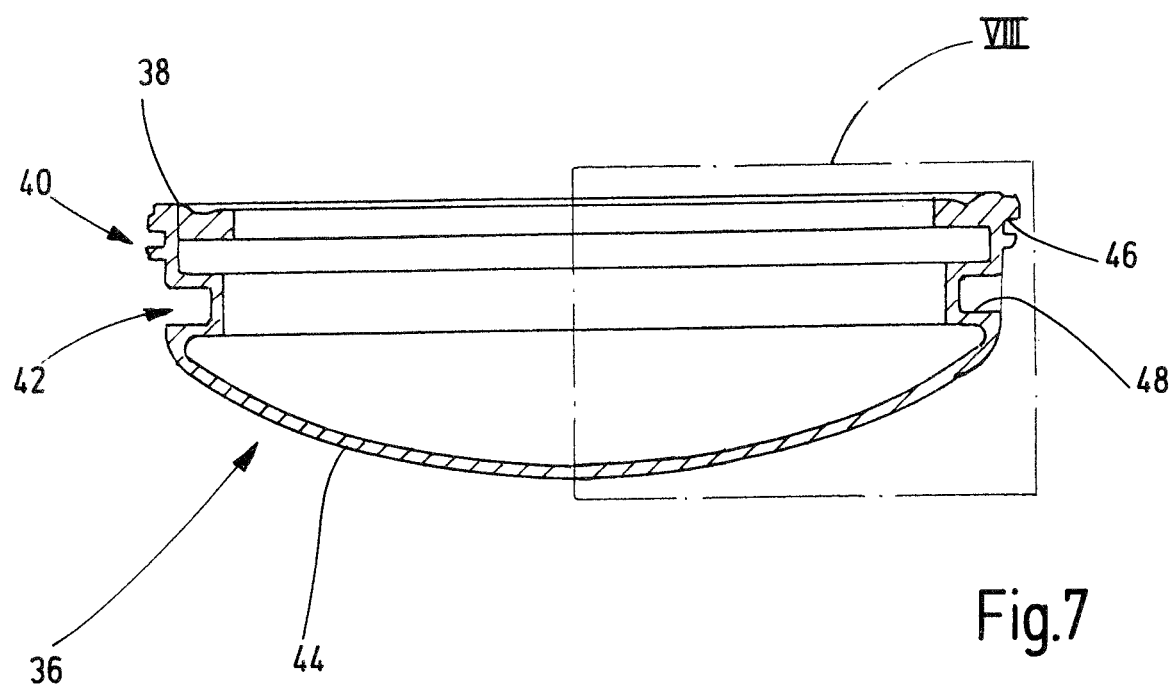
Figure 8:
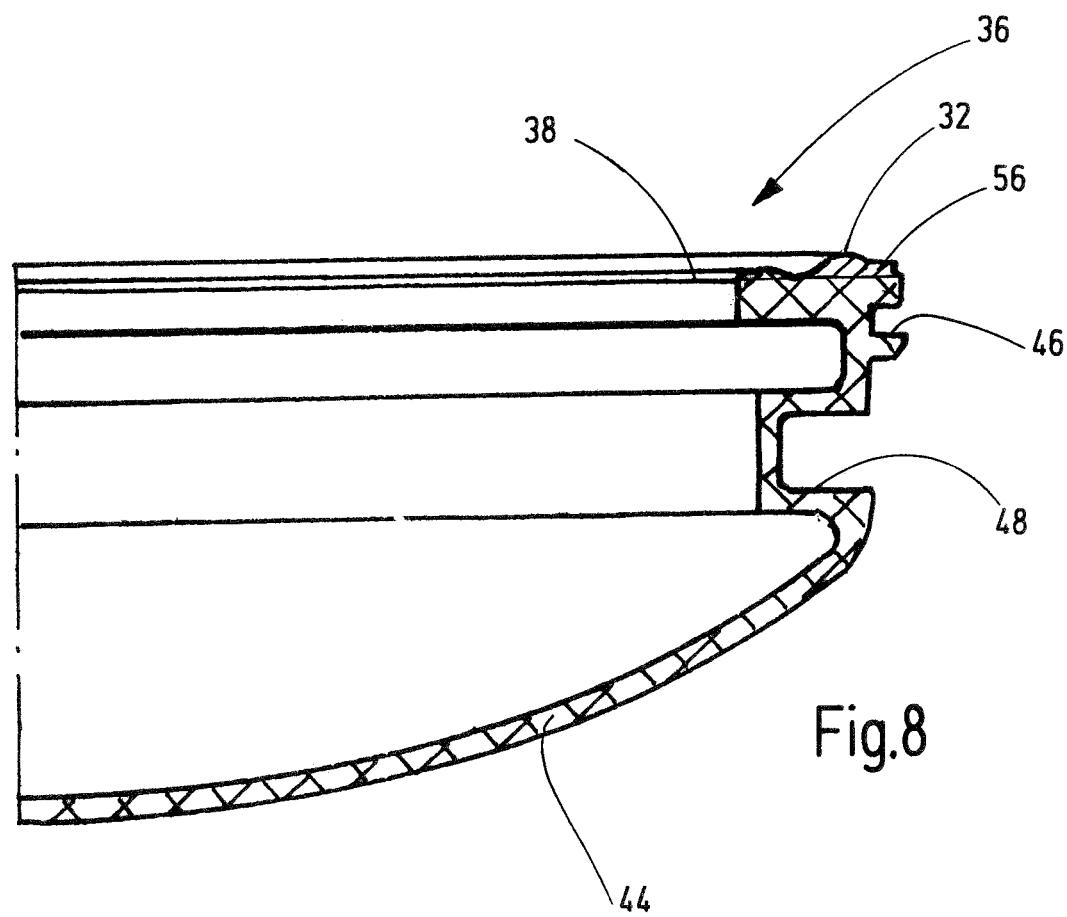

FIG. 7 shows a longitudinal section of the guiding part of the bellows accumulator according to the invention; and FIG. 8 shows an enlarged partial section of the area, designated by VIII in FIG. 7, of the guide device of a modified exemplary embodiment The exemplary embodiment, shown in FIG. 1, of the bellows accumulator according to the invention has an accumulator housing designated as a whole by 2, which has two housing parts made of Titanium, one of which forms a main housing part designated by 4 and the other of which forms a housing closing part designated by 6. The main part 4 has the form of a pot having a circular-cylindrical interior 8 and a dome-shaped pot bottom 10, which is closed except for a centrally situated fluid port 12. The closing part 6 is shaped like a semispherical shell, which is closed except for a filling opening 16 coaxial with the longitudinal housing axis 14. The main part 4 and the closing part 6 are welded together along their end rims facing each other at a weld line 18. A separating bellows in the form of a metallic bellows 20 is accommodated in the circular cylindrical interior 8 between the weld line 18 and the pot bottom 10. As is common with bellows for bellows accumulators, the bellows 20 is made of a stainless steel, wherein in the present example a chromium-nickel-molybdenum steel alloy (AM350) is provided. At its end at the top in FIG. 1, at which the bellows 20 is open to the gas end 22, adjacent to the filling opening 16, of the accumulator housing 2, the last bellows fold of the bellows 20 is welded to a retaining ring 24, which forms the securing device used to fix the immovable bellows end of the bellows 20 to the accumulator housing 2. The retaining ring 24 is, which is not apparent from the simplified illustration of FIG. 1, built from two material components, as shown in more detail in FIGS. 3 and 4. This multi-component structure, wherein one component is made of titanium and another component is made of stainless steel, such as steel 1.4435, provides the option of welding the retaining ring 24 to the end of the bellows 20 and with its titanium component to the accumulator housing 2 made of Titanium. Laser welding can be used here to simultaneously form the joint between the housing parts 4 and 6 at the welding line 18 and the welded joint with the titanium component of the retaining ring 24.

FIGS. 3 and 4 show the multi-component structure of the retaining ring 24. The first component is formed by a titanium ring 26 arranged on a planar face 28 of a stainless-steel ring 30 forming the second component, wherein said stainless-steel ring 30 in this example is formed of stainless steel 1.4435. As FIG. 4 most clearly shows, the titanium ring 26 has a slightly larger diameter than the stainless-steel ring 30, such that it projects radially circumferentially beyond the stainless-steel ring 30. This protrusion of the titanium ring 26 forms the weld area where the retaining ring 24 is welded to the housing parts 4 and 6 at the weld line 18 for securing. As can also be seen in FIG. 4, the stainless-steel ring 30 has a slightly protruding annular bulge 32 on the free end face facing away from the titanium ring 26, wherein said annular bulge 32 forms the weld line for connecting the retaining ring 24 to the last fold of the bellows 20.

FIGS. 5 and 6 show the multi-component structure of the retaining ring 24 of a second exemplary embodiment. Here, the stainless-steel ring 30 has a raised peripheral rim 34, on the outer circumference of which the titanium ring 26 in the form of a cylindrical ring is arranged, which forms an enclosure of the retaining ring 24. As in the example of FIGS. 3 and 4, the titanium ring 26 forms the weld area at the weld line 18. Also, as shown in FIGS. 3 and 4, a flat annular bulge 32 forms the weld line for the connection to the bellows 20. As in FIGS. 3 and 4, the firm connection of the components of the retaining ring 24 is formed by cladding, such as explosive cladding.

At its other, free end, which is opposite from the open bellows end connected to the retaining ring 24, the interior of the bellows 20 is closed by a guide part 36 made of stainless steel (such as steel 1.4435), wherein said guide part 36 is firmly welded to the facing bellows end. The guide part 36 (shown separately in FIG. 7) has the shape of a circular bowl, on the outer circumference of which, starting from the open rim 38 of the bowl, a guide device 40 and a sealing device 42 adjoining it are formed. This is adjoined by a dome part 44 forming the bottom of the bowl, wherein the contour of said dome part 44 corresponds to the inner contour of the pot bottom 10 of the main housing part 4. In the end position of the bellows 20 shown in FIG. 1, the dome part 44 is therefore in contact with the inside of the pot bottom 10, see FIG. 1. The guide device 40 has a narrow circumferential annular groove 46 near the rim of the bowl 38 and a wider annular groove 48 located between the annular groove 46 and the dome part 44. The narrow annular groove 46 of the guide device is provided for receiving a narrow guide ring, which is not shown in the drawing, whereas the annular groove 48 of the sealing device 42 receives a sealing ring 50, which is visible in FIG. 1.

As is known per se for bellows accumulators and is also shown in DE 10 2015 012 253 A1 mentioned with respect to the prior art in FIG. 2, the outer diameter of the bellows 20 is somewhat smaller than the inner diameter of the cylindrical part of the main housing part 4, resulting in a small gap remaining between the bellows 20 and the inner wall. The guide ring (not shown) in the annular groove 46 has the function of guiding the bellows folds along the inner wall during motions out of the end position shown in FIG. 1 while maintaining the gap. For this purpose, the guide ring is made of a flat ring of a plastic having good sliding properties, such as polytetrafluoroethylene, as shown in FIGS. 5 and 6 of EP 2 519 748 B1. To form fluid passages at the circumference of the guide ring to permit fluid to pass from the fluid port 12 into the interior 8 surrounding the bellows 20, recessed areas are formed as passage spaces at the circumference of the guide ring between guide bodies abutting the housing wall as guide shoes. In operation, therefore, the interior 8, surrounding the bellows 20, forms a part of the oil side. When the bellows 20 is not fully compressed, the spaces between the bellows folds form damping spaces as part of the oil side, wherein the volumes of said spaces change correspondingly during the bellows motions in operation, wherein one damping throttle each is formed between every tip of the folds and the inner wall of the housing, wherein the selected gap dimension between the inner wall of the main part 4 and the tips of the bellows determines the throttle cross-section.

As FIG. 1 shows, at the transition between the main housing part 4 and the pot bottom 10, the inner diameter of the housing is tapered by an inner cone 52 forming a ramp surface 52, which the gasket 50 of the sealing device 42 traverses to a cylindrical sealing surface 54 when the bellows 20 has moved to its end position shown in FIG. 1. As a result, the fluid passage from the fluid port 12 to the interior 8 is blocked only in the end position of the bellows, but opened in other bellows positions. Whereas, as can be seen in FIG. 1, the bellows 20 is composed of diaphragm-like annular discs, wherein said discs extend planar towards the circumferential rim, the diaphragm discs can also have a profiling in the form of a waveform, as shown by way of example in FIG. 4 of DE 10 2006 014 456 A1.

FIG. 8 shows an embodiment permitting a particularly lightweight construction of the bellows accumulator. Here, the guide part 36 is made of titanium and has, on its bowl rim 38 facing the bellows 20, an additional component in the form of a flat ring 56 made of stainless steel, such as steel 1.4435, wherein said flat ring 56 corresponds regarding its function to the steel ring 30 of FIGS. 3 to 6, which forms the steel component on the retaining ring 24. Like the steel ring 30 of FIGS. 3 to 6, also the flat ring 56 is attached to the end face at the bowl rim 38 of the guide member 36 by cladding, such as explosive cladding. Like the steel ring 30, the flat ring 56 has a protruding annular bulge 32 that forms the weld line of the welded joint to the bellows 20.

As FIG. 1 shows, the main housing part 4 has, starting from a thickened wall part 58 adjoining the weld line 18, an area of reduced wall thickness extending to the area of the pot bottom 10. As indicated in FIG. 1, this area has a fiber wrap 60 of fiberglass material extending beyond the weld line 18 up to the beginning area of the housing part 6. The fiber wrap 60 corresponds, with regard to their structure, to the wraps increasing the compressive strength known by the technical name "liner" in pressure vessels.

The invention claimed is:

1. A bellows accumulator, consisting of at least two housing parts (4, 6) which form an accumulator housing (2), and having a separating bellows (20), which is movably arranged in the accumulator housing (2) and separates two media spaces (8, 22) from each other and is at least on its one free end fixed to a securing device (24) in the accumulator housing (2), wherein said securing device (24) is welded to the adjacently arranged housing parts (4, 6), characterized in that the adjacently arranged housing parts (4, 6) comprise at least in part titanium materials, in that the securing device (24) consists of at least two interconnected components (26, 30), at least one (26) of which comprises at least in part titanium materials and is welded to the adjacently arranged housing parts (4, 6), and in that the respective other component (30), consisting of a different metal material, is used for securing the separating bellows (20) to the securing device (24).

2. The bellows accumulator according to claim 1, characterized in that the separating bellows (20) and the respective other component (30) of the securing device (24) are made of stainless steel.

3. The bellows accumulator according to claim 1, characterized in that the two adjacent housing parts (4, 6) and the one component (26) of the securing device (24) are made of titanium.

4. The bellows accumulator according to claim 1, characterized in that the one component (26) consisting of titanium and the other component (30) made of stainless steel are firmly interconnected by plating.

5. The bellows accumulator according to claim 1, characterized in that the securing device is formed as a closed ring (24) and in that the one component (26) encompasses the other component (30) annular or is fixed, annular and having a projecting protrusion, to the one end face (28), facing away from the end face having the welded-on separating bellows (20), of the other component (30).

6. The bellows accumulator according to claim 1, characterized in that the welded joint (18) between the two adjacent housing parts (4, 6), forming a lower and an upper shell of the accumulator housing (2), is obtained in conjunction with the titanium component (26) of the securing device (24) by means of an electron beam welding process.

7. The bellows accumulator according to claim 1, characterized in that the other free end face of the separating bellows (20) is closed by a guide part (36), which is firmly welded to the separating bellows (20).

8. The bellows accumulator according to claim 1, characterized in that the guide part (36) has a guide device (40) and a sealing device (42), and in that the sealing device (42) is effective at least in the end position of the separating bellows (20) when the media connection (12) in the accumulator housing (2) is closed and is ineffective in other operating positions of the separating bellows (20) that deviate therefrom.

9. The bellows accumulator according to claim 1, characterized in that the guide part (36), at its end facing the media port (12), comprises a dome (44), the outer contour of which follows the inner contour of the lower shell (10) in the area of the media port (12) and is brought at least partially into contact with the latter in one end position.

10. The bellows accumulator according to claim 1, characterized in that the sealing device (42) is arranged between the dome (44) and the guide device (40) of the guide part (36) and is set back in diameter relative to the guide device (40).

11. The bellows accumulator according to claim 1, characterized in that the guide part (36) is formed from titanium and has, on its end face facing the separating bellows (20), an annular component (56) firmly attached by cladding and made of stainless steel, at which the welded connection to the separating bellows (20) is formed.

\* \* \* \* \*